United States Patent Office 3,506,627
Patented Apr. 14, 1970

3,506,627
COPOLYMERIZATION OF ALPHA OLEFINS IN THE PRESENCE OF VINYLIDENE AROMATIC HYDROCARBONS
Semih Zaim, Sarnia, Ontario, Canada, assignor to Polymer Corporation Limited, Sarnia, Ontario, Canada, a body corporate and politic
No Drawing. Filed Oct. 18, 1965, Ser. No. 497,450
Claims priority, application Canada, May 1, 1965, 929,611
Int. Cl. C08f 15/40
U.S. Cl. 260—80.7                    12 Claims

ABSTRACT OF THE DISCLOSURE

An improved gel-free rubbery copolymer of ethylene is produced by copolymerizing a monomer mixture of ethylene and propylene and, if desired, a copolymerizable diene with a catalyst comprising an organo-aluminum compound and a compound of vanadium in the presence of less than 50% by weight of monomers of a vinylidene aromatic hydrocarbon such as styrene or allyl benzene. The copolymers containing about 1–10 mol percent of the units derived from the vinylidene aromatic hydrocarbon show improved processability and heat resistance.

---

This invention relates generally to the copolymerization of ethylenically unsaturated hydrocarbons and particularly, to an improved process of copolymerizing ethylene or a higher alpha olefin with another olefin in the presence of a vinyl aromatic hydrocarbon.

Much work has been carried out in recent years on the copolymerization of ethylene or propylene with each other and/or with other olefins and diolefins such as butene, styrene, isoprene, 1,4-hexadiene. It is known, for example, that ethylene and propylene can be copolymerized at relatively low temperatures and pressures to produce rubbery polymers in the presence of the so-called Ziegler catalysts. It is also known that a diolefin such as dicyclopentadiene, 1,4-hexadiene or cyclooctadiene-1,5 can be copolymerized with ethylene and propylene to produce a sulfur vulcanizable polymer. Since the reactivity of ethylene is many times higher than that of other monoolefins in the low pressure polymerization processes, special procedures and/or special catalysts are required to produce amorphous polymers having good rubbery properties. However, these special procedures such as using a monomer feed mixture of a low ethylene content, polymerizing at a low temperature and/or in the presence of a catalyst having reduced activity towards ethylene, are not always effective and frequently a copolymer is obtained which is insoluble in the polymerization medium and tends to deposit on the walls of a reactor and, in consequence, the productivity of the reactor is greatly reduced.

It has now been found that greatly improved copolymerization of at least two alpha olefins can be obtained by carrying out the reaction in the presence of a vinylidene aromatic hydrocarbon, such as styrene or allyl benzene. The vinylidene aromatic hydrocarbon moderates the polymerization reaction by depressing the rate at which the fast reacting monomer enters the copolymerization. Furthermore, it eliminates reactor fouling and results in the production of homogeneous gel free rubbery copolymers. This beneficial effect of the vinylidene aromatic hydrocarbon is strikingly evident in the polymerization system containing a diene such as fast reacting dicyclopentadiene, butadiene or isoprene in addition to a mixture of alpha olefins. The effect is unexpected and surprising.

The object of this invention is to provide an improved process of copolymerizing aliphatic alpha olefins.

A further object of the invention is to provide a process of copolymerizing at least two aliphatic alpha olefins, and, if desired, a multiolefin, in the presence of a vinylidene aromatic hydrocarbon.

A still further object is to provide a gel-free rubbery copolymer of ethylene, an oliphatic alpha olefin containing 3–12 carbon atoms, a vinylidene aromatic hydrocarbon and, if desired, a multiolefin.

The objects of the invention are achieved in the improved process of copolymerizing at least two aliphatic alpha olefins containing 2–12 carbon atoms which comprises contacting said alpha olefins with a catalyst comprising an organo-aluminum compound and a compound of a transition metal of Group V–B of the Periodic Table in the presence of less than 50 percent by weight of said alpha olefins of a vinylidene aromatic hydrocarbon.

In one of the specific embodiments, the objects of the invention are achieved in the process of copolymerizing ethylene, propylene and a diene having 4–12 carbon atoms which comprises contacting a liquid mixture containing 100 parts by weight of copolymerizable monomers, the composition of said monomers being between 10 and 80 mole percent of ethylene, between 90 and 20 mole percent of propylene and between 0.5 and 20 mole percent of said diene, with a catalyst comprising an alkyl aluminum dihalide and a vanadium compound, the molar ratio of aluminum to vanadium being between 3:1 and 20:1, in the presence of 2–30 parts by weight of styrene, and recovering a rubbery copolymer containing less than 20 percent by weight of the diene units, less 20 percent by weight of styrene units, and the remainder being the units of ethylene and propylene in a molar ratio between 1:3 and 3:1.

The terms "copolymerize," "copolymerization" and "copolymer" as used throughout the specification and claims, refer to polymerization processes and products of these processes in which at least two monomers are polymerized to form a polymeric material the molecules of which contain units of at least two monomers. Accordingly, these terms are not restricted to binary systems in which only two monomers are converted to polymer, but also include multiple systems in which three, four or more monomers are converted to inter-polymers containing in their molecules units of three, four or more monomers.

The process of the invention may be employed in the copolymerization of a variety of ethylenically unsaturated hydrocarbons containing 2–12 carbon atoms, although it is particularly advantageous in the copolymerization of an aliphatic alpha olefin such as ethylene, propylene, butene-1 or 3-methyl pentene-1 with another aliphatic alpha olefin. Representative examples of alpha olefin pairs which can be copolymerized in the process of the invention are ethylene and propylene, ethylene and butene-1, ethylene and 3-methyl butene-1, propylene and butene-1. Additional monomers such as a third alpha olefin or a multiolefin may also be present. The proportion of alpha olefins in the polymerizable mixture may vary within wide limits, but it is preferred to maintain the concentration of the fast reacting alpha olefin below a level at which a crystalline homopolymer or a copolymer containing more than 80% of the units of said alpha olefin is formed. In the ethylene-propylene system, ethylene is the faster reacting alpha olefin and its concentration in the feed is maintained at a level of 80 mole percent or less, between 10 and 80 mole percent; of the total monomer present in the feed. Conversely, propylene concentration is maintained between 90 and 20 mole percent. Best results are obtained with monomer feed containing 10–40 mole percent of ethylene and 90–60 mole percent of propylene. The optimum proportions of monomers in the ethylene-butene-1 or ethylene-pentene-1 system are slightly shifted to lower ethylene concentrations. When two alpha olefins, having 3 or more carbon atoms, are copolymerized with ethylene, the relative proportion of one alpha olefin to the other is not critical and may be varied within wide limits from 1/99 to 99/1. If it is desired to produce a sulfur vulcanizable copolymer, a multiolefin is included in the monomer feed. The multiolefin polymerizes through one double bond and at least one other double bond of the multiolefin is incorporated in the polymer and is available for the crosslinking reaction with sulfur in the vulcanization step. The multiolefin which is preferably used is a diene, although a triene may also be used. The diene may be an aliphatic, cycloaliphatic or an aromatic hydrocarbon in which double bonds are either conjugated or non-conjugated. The aliphatic and cycloaliphatic dienes are preferred. The number of carbon atoms in the diene may vary between 4 and 18, although it is preferred to use those containing 4–12 carbon atoms. Representative examples of the dienes are aliphatic dienes such as butadiene-1,3, isoprene, pentadiene-1,3, hexadiene-1,4, 2, 3- dimethylbut:i-diene-1,3, 2-methylheptadiene-1,5; aromatic dienes such as 2-phenyl butadiene-1,3, divinyl benzene; cycloaliphatic dienes such as vinyl cyclohexene, limonene, cyclopentadiene, methyl cyclopentadiene, cyclooctadiene-1,3, cyclooctadiene-1,5, dicyclopentadiene, 5-methylene norbornene-2, norbornadiene-2,5. It is preferred to use the dienes which polymerize at a rate similar to or lower than that of ethylene such as cyclooctadiene-1,5, vinyl cyclohexene, but advantages of the present invention are apparent also in the presence of fast reacting dienes such as dicyclopentadiene, butadiene-1,3, or isoprene. The diene is charged in an amount smaller than the sum of alpha olefins, preferably in the range between 0.5 and 20 mole percent of the total monomer charge. For best results, the monomer feed contains about 1–10 mole percent of the diene.

The process of the invention is carried out in the presence of a vinylidene aromatic hydrocarbon. The hydrocarbon preferably has one vinylidene group attached to an aromatic radical such as phenyl, naphthyl, indenyl radicals or alkyl substituted derivatives thereof and may be represented by the formula

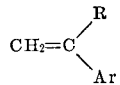

where R is hydrogen or a $C_{1-3}$ alkyl group and Ar is an aromatic hydrocarbon radical which is free of non-aromatic double bonds. Representative examples of the vinylidene aromatic hydrocarbons are styrene, alpha methyl styrene, allyl benzene, vinyl toluene, vinyl naphthalene, 1-vinyl 4-ethyl benzene. It is preferred to use the vinylidene aromatic hydrocarbons containing between 8 and 18 carbon atoms.

The amount of the vinylidene aromatic hydrocarbon may be varied within a wide range in the polymerization mixture, although for good high molecular weight copolymer, it is preferred to use less than 50% by weight of the sum of alpha olefins and diene. The most preferred amount is about 2–30 percent by weight of the total monomers, although advantages of the present invention are apparent in the copolymers produced in the presence of less than 2 percent based on total monomers, of the vinylidene aromatic hydrocarbon.

The copolymerizable monomers as hereinbefore described are contacted with a catalyst composition comprising an organo-aluminum compound and a compound of a transition metal of Group V–B of the Periodic Table. The Periodic Table referred to is that shown in "Handbook of Chemistry and Physics," 39th ed., Chemical Rubber Publishing Co., Cleveland, Ohio, at pp. 400–401. The organo-aluminum compound may be represented by the general formula $R_{(3-a)}AlX_a$ where R is a hydrocarbyl radical, X a halogen atom and $a$ is a number greater than 1 and smaller than 3. The type and size of the hydrocarbyl radical is not critical. It may contain from 1 to 18 carbon atoms and be an aliphatic, cycloaliphatic or aromatic radical. Aliphatic radicals are preferred, in particular those containing 2–8 carbon atoms. X may be chlorine, bromine or iodine, although for practical reasons, chlorine is preferred. The number of halogen atoms in the compound may vary between about 1.1 to about 2.5. However, for best results, it is preferred to use organo-aluminum compound containing about 1½ to 2 halogen atoms. Representative examples of the organo-aluminum compounds are alkyl aluminum dihalides such as ethyl aluminum dichloride, isobutyl aluminum dichloride, hexyl aluminum dichloride, methyl aluminum dibromide and mixtures thereof; sesquihalides such as ethyl aluminum sesquichloride, isobutyl aluminum sesquibromide, isooctyl aluminum sesquichloride and mixtures thereof. These compounds can be prepared by reacting aluminum trihalide and trihydrocarbyl aluminum or hydrocarbyl aluminum mono- and dihalides and isolating them in a known manner.

The transition metal compounds which may be used are selected from compounds of Group V–B metals. The preferred transition metal is vanadium. The compounds of the transition metals include halides, complex halides, oxyhalides, alkoxides, carboxylates, diketonates. The hydrocarbon-soluble compounds and the compounds which, when reacted with the organo-aluminum compounds, form soluble or colloidally dispersible product are preferred. Examples of such compounds of transition metals are $VCl_4$, $VOCl_3$, $VO(OR)_3$, $VO(OOCR)_2$,

$VCl_3OR$, where R is selected from hydrocarbon radicals containing 1 to 12 and preferably 2–8 carbon atoms and $m$ is 1 to 3.

The relative proportions of the components in the catalyst composition may vary within wide limits, although it is desired to use at least 2 moles of the organo-aluminum compound per mole of the transition metal compound. The upper limit of the relative proportion of the catalyst components is not critical and may vary somewhat depending on the type of monomers and catalyst components used, but it is advisable not to exceed 25 moles of the organo-aluminum compound per mole of the transition metal compound. In the preparation of good rubbery copolymer, it is preferred to use a catalyst having about 3–20 moles of the organo-aluminum compound per mole of vanadium compound.

The catalyst may be added to the polymerization system either in a preformed form or formed in situ; that is, the components may be mixed in reactor in the presence of monomers. The preformed catalyst is prepared by mixing the components preferably in the presence of an inert diluent at a temperature not higher than 30° C. and stored at a reduced temperature of about −20° C. to 0° C. if not used immediately. In the continuous polymerization system, it is preferred to add continuously the catalyst components through separate feeding lines and react them in reactor in the presence of monomers. The amount of the total catalyst required to support the copolymerization reaction may be experimentally determined. It varies depending on the monomers used, diluents, temperatures and impurities present in the system. As little as 0.05 percent of the monomer weight of the catalyst is effective, but up to 10 percent can be used, if desired. The practical amounts, however, are about 0.2 to 5 percent by weight of the total monomers.

In a preferred embodiment of the invention, the polymerizable mixture of alpha olefins and, if desired, a diene is contacted with the catalyst in the presence of a nonreactive organic liquid diluent which is a solvent for the monomers and for the polymer formed. It is advantageous to use the liquid diluent which also is a solvent for the catalyst although it is not essential. Suitable organic liquids which may be used as the polymerization medium are the hydrocarbons such as aromatic, aliphatic or cycloaliphatic hydrocarbons and chlorinated hydrocarbons or mixtures thereof. Examples of suitable diluents are butane, pentanes, hexanes, heptanes, octanes, decanes, benzene, toluene, xylenes, cyclohexane, chlorobenzene. The non-aromatic hydrocarbons containing 5–8 carbon atoms are preferred. The amount of the diluent may vary from ½ volume to 50 volumes per one volume of total monomers, although it is preferred to use 2–10 volumes. However, the presence of the non-reactive organic liquid is not essential and in some cases it may be desirable to copolymerize alpha olefins in a system in which the monomers themselves act as diluent.

The copolymerization may be carried out over a wide temperature range varying from about −40° C. to about 125° C. The preferred range is from about 0° C. to about 80° C. In order to maintain a suitable concentration of the copolymerizing monomers in the liquid reaction mixture, the copolymerization is carried out under pressure. The pressure may vary from atmospheric pressure to about 30 atmospheres, depending on the temperature and concentrations of the volatile components. It is advantageous to operate at a pressure of about 2 atmospheres to about 10 atmospheres.

The copolymers which are produced in the process of this invention are rubbery copolymers of at least two alpha olefins containing not less than 65 and up to 100 percent by weight of units derived from said alpha olefins. The following combinations of alpha olefins can be present in the copolymer: ethylene and propylene, ethylene and butene-1, ethylene and 3-methyl-butene-1, propylene and butene-1, or ethylene, propylene and butene-1. The relative proportion of the units derived from one alpha olefin to those derived from the other alpha olefin or olefins may vary in the limits from 1:4 to 4:1, although it is preferred to maintain the proportion at a level ranging between 1:3 and 3:1, For example, in the ethylene-propylene copolymer, the ethylene content may vary between 20 and 80 mole percent and preferably between 25 and 75 mole percent of the sum of ethylene and propylene units or, when expressed in percent by weight, between 14 and 73 percent and preferably between 18 and 67 percent. In the sulfur-vulcanizable copolymer such as the ethylene-propylene-dicyclopentadiene, the ethylene content relative to propylene is maintained within the same limits as in the binary copolymer. The amount of ethylene, however, based on the total polymer is lower depending on the amount of dicyclopentadiene incorporated in the copolymer. The amount of dicyclopentadiene or other diolefin may vary from 0.5 to about 20 percent by weight of the total polymer. For satisfactory sulfur vulcanization, the preferred amount of the diolefin in the copolymer is about 1 to 10 percent by weight.

The copolymer may also contain a small amount of units derived from the vinylidene aromatic hydrocarbon present in the polymerization system. Less than 30 weight percent of the vinylidene aromatic hydrocarbon can be present in the copolymer and the preferred amount is less than 10 weight percent. The most preferred copolymer of this invention contains about 1–10 weight percent of units of vinylidene aromatic compound. The copolymer is essentially soluble in a liquid hydrocarbon. It is also transparent, that is, free of gel or other optically dissimilar structures and shows an improved processability in comparison to copolymer free of vinylidene aromatic hydrocarbon or prepared in the absence of vinylidene aromatic hydrocarbon. In contrast to the known copolymers of ethylene and propylene or ethylene, proplyene and e.g dicyclopentadiene, the corresponding polymers which are produced in the process of this invention and which contain units of the vinylidene aromatic monomer are charaterized by improved stability to the degradative effect of heat treatment and mastication. The presence of relatively small amount of aromatic rings in the polymer apparently reduces the vulnerability of high molecular weight copolymers of alpha olefins to chain scission. Aromatic rings also reduce the tendency of the double bonds, if such are present in the copolymer, to act as the sites of the premature crosslinking such as may occur on milling or other mechanical handling of the copolymer in the absence of cross-linking agents.

Having described the invention in general terms, it is further illustrated by the following examples in which the copolymerization of ethylene and propylene or ethylene, propylene and various dienes such as dicyclopentadiene, cyclooctadiene or butadiene was carried out in the presence of varying amounts of styrene or allyl benzene.

The copolymerization experiments were carried out in vessels of different size and design. 200 mls. crown capped bottles were used for the preparation of small samples such as required for X-ray, I.R., and intrinsic viscosity testing. Larger samples such as required in testing physical properties of raw and vulcanized rubbers were prepared in agitated glass reactors of 1 liter and 2 liter capacity.

Chemically pure hydrocarbons were used in the copolymerization experiments. Gaseous ethylene and propylene having a minimum purity of 99.5 percent and 99.0 percent respectively, were mixed in a ratio as desired either in a separate pressure vessel or in a feed line and the mixture was pressured into the polymerization vessel. A plastic grade of styrene having a purity of 99.9 percent was dried by prolonged storing over activated alumina. Other hydrocarbons, namely, allyl benzene having a purity of 96.7 percent, dicyclopentadiene having a purity of 95.6 percent, cyclooctadiene-1,5 having a purity of 97 percent and pure grade normal-heptane, all were dried by storing in a nitrogen atmosphere over molecular sieves having pore sizes of 4 and 5 angstroms. As the organo-aluminum component of the catalyst, 20 percent solutions in hexane of ethyl aluminum dichloride ($EtAlCl_2$) alone or mixed with diethyl aluminum monochloride were used. The solutions were diluted before use with n-heptane to a concentration of 1 mole/liter.

Vanadium oxytrichloride having a minimum purity of 95 percent, was used as a 0.1 molar solution in n-heptane. The solution was aged not more than 30 hours at room temperature. Tri-butyl vanadate having a purity of more than 99 percent, was used as a 0.1 molar solution in n-heptane.

EXAMPLE I

Ethylene and propylene were copolymerized in the presence of allyl benzene using a glass reactor of 1 liter capacity. The reactor was equipped with a stirrer operating at 700 r.p.m., thermometer and an injection point. An inlet tube having a sintered glass disc at the end extended into the lower half of the reactor, and an outlet for a gaseous effluent from the reactor was also provided. The reactor was thoroughly dried in an electric oven at 105° C. and flushed with dry nitrogen gas. To the so-prepared reactor, 650 mls. of dry n-heptane was pressured from a storage vessel. A gaseous mixture of ethylene and propylene was introduced through the inlet tube at a constant rate of 2000 mls./minute and bubbled through the heptane. The mixture was prepared by metering from supply cylinders 1 volume of ethylene and 2 volumes of propylene, both being under pressure of 0.2 atmosphere gauge and at 20° C. and mixing them in the feed line ahead of the inlet tube. In about 30 minutes the heptane in the reactor became saturated with the mixture and the volume of the effluent gas was equal to the total volume of ethylene and propylene fed to the reactor. Next, without interrupting the flow of ethylene and propylene, 18.5 mls. of a 12.5 percent solution of allyl benzene in heptane was injected and the polymerization reaction was initiated by injecting 7 mls. of a preformed catalyst. The catalyst was made by mixing 9 mls. of 0.1 molar solution of VOCl$_3$ and 8.1 mls. of 1.0 molar EtAlCl$_2$ solution and ageing the mixture at room temperature for 10 minutes. The remainder of the preformed catalyst was added to the reactor after the initiation in portions of 1 ml. every minute. Additional allyl benzene was introduced in portions of 1 ml. of the 12.5 percent solution every minute for the next 25 minutes after the initiation. 30 minutes after initiation, the reaction was stopped by adding about 10 mls. of ethanol and the polymeric product was recovered by precipitation from the heptane solution with about 500 mls. of a 1 percent ethanolic solution of ditertiary butyl p-cresol stabilizer. The precipitate was isolated, washed twice with 1 percent solution in ethanol of ditertiary butyl p-cresol and dried in a vacuum oven at 50° C. to a constant weight. 9.0 gms. of a polymer were obtained. It was completely soluble in heptane and toluene, respectively, at room temperature and completely free of X-ray crystallinity. The composition of the product was determined using an infra-red spectrophotometer. The ratio of absorbances at the 7.25 micron and the 6.83 micron bands used as a measure of the propylene content in the copolymer indicated that the product contained 45 percent by weight of propylene. Bands in the ultra violet range of the spectrum due to the presence of benzene rings indicated that 3.5 percent by weight of allyl benzene was incorporated in the copolymer. The remaining 51.5 percent by weight of the polymer was assumed to be derived from ethylene. The intrinsic viscosity [$\eta$] determined in toluene at 30° C. was 6.35 dl./g.

EXAMPLE II

Ethylene, propylene and dicyclopentadiene (DCP) were copolymerized in 200 mls. crown capped bottles in the presence of allyl benzene. The bottles had been thoroughly dried in an electric oven at 105° C., then rinsed with a dilute (about 2 percent) solution of triethyl aluminum followed with dry n-heptane and flushed with nitrogen. The bottles filled with nitrogen at atmospheric pressure were then capped and the reaction components volumetrically charged using a hypodermic needle inserted through a self-sealing gasket in the perforated cap. 130 mls. of dry heptane was charged first, followed by 0.2 ml. of dicyclopentadiene and a variable amount of allyl benzene. The bottles were then connected to a pressure vessel containing a gaseous mixture of ethylene and propylene in a molar ratio of 1:4 and held for 30 minutes under a pressure of 2.8 atmospheres at a temperature of 0° C. to saturate the liquid medium. 10.0±0.4 gms. per bottle of the mixture of ethylene and propylene was introduced in that manner. 3 mls. of 0.1 molar solution of VOCl$_3$ and 2.7 mls. of 1 molar solution of EtAlCl$_2$ were next added to initiate the copolymerization reaction. The copolymerization proceeded at room temperature for 1 hour after which time the reaction was terminated by releasing the pressure and injecting 5 mls. of ethanol. The contents of each bottle were next transferred to a beaker and mixed with 250 mls. of 1 percent solution of ditertiary butyl p-cresol in ethanol to precipitate the product. The precipitated polymer was then washed twice with ethanol containing ditertiary butyl p-cresol and dried at 50° C. in vacuum to a constant weight.

Polymers were tested for intrinsic viscosity [$\eta$] in toluene at 30° C. and solubility at room temperature. The dicyclopentadiene (DCP) content was determined using an iodometric method. For that purpose, purified polymer was dissolved in carbon tetrachloride, treated for 30 minutes at room temperature with an excess of iodine solution in the presence of mercuric acetate and trichloroacetic acid. The excess of iodine that was not consumed in the reaction with the double bond of the dicyclopentadiene units in the polymer was titrated with a sodium thiosulfate solution. The DCP content was calculated from the amount of iodine consumed considering that 2 atoms of iodine are required to saturate one double bond and then expressed in weight percent on the polymer. Propylene and allyl benzene contents were determined as described in Example I. Results are presented in Table I.

TABLE I

|  | Bottle No. | | | | |
| --- | --- | --- | --- | --- | --- |
|  | 1 | 2 | 3 | 4 | Control |
| Allyl benzene (mls.) | 0.2 | 0.6 | 1.0 | 1.5 | Nil |
| Conversion (percent) | 27 | 26 | 24 | 23 | 30 |
| Intrinsic Viscosity (dl./g.) | 1.22 | 0.99 | (¹) | 1.06 | 1.31 |
| Propylene content, (percent by wt.) | 46.3 | 46.4 | 46.2 | 43.1 | 45 |
| DCP content (percent by wt.) | 5.6 | 3.7 | 3.9 | (¹) | 6.8 |
| Allyl benzene (percent by wt.) | 1.0 | 2.0 | 2.7 | 3.4 | Nil |

¹ Not tested.

The polymers of Table I were found to be 100% soluble in toluene and heptane, showed no X-ray crystallinity, and formed clear transparent solutions in heptane. The product of bottle 3 was fractionated into three fractions of different solubility in a heptane-ethanol mixture. The presence of allyl benzene was spectrophotometrically detected in all fractions. It is noted that the conversion of dicyclopentadiene decreased in the presence of allyl benzene.

EXAMPLE III

Three mixtures of ethylene and propylene were consecutively copolymerized in the presence of styrene using a 2-liter agitated reactor. The reactor consisting of a glass bowl having inserted four stainless steel vertical baffles and a stainless steel lid fitted tightly onto the bowl and equipped with a hydraulically driven turbine agitator, thermocouple, cooling coil, monomer inlet tube, cement outlet tube and points for injecting reactants through self-sealing gaskets was thoroughly dried in an electric oven at 105° C., rinsed with a dilute solution of triethyl aluminum, followed by dry heptane and flushed with dry nitrogen. 1560 mls. of n-heptane was pressured into the reactor through the monomer inlet tube and styrene was subsequently injected in an amount indicated in Table II. The reactor was then connected to a pressure vessel containing a mixture of ethylene and propylene in a desired ratio and held under a pressure of 2.8 atmospheres at 0° C. for 30 minutes to saturate heptane with the ethylene-propylene mixture. The copolymerization was next initiated by injecting solutions of VOCl$_3$ and EtAlCl$_2$ in a molar ratio of 1:10. The pressure of 2.8 atmospheres was maintained for 30–60 minutes by keeping the inlet line open to the pressure vessel while the copolymerization proceeded at about 0° C. Thereafter, the reactor contents were pressured out into a vessel containing 1500 mls. of 1 percent ethanolic solution of ditertiary butyl p-cresol and polymeric material separated from the liquid mixture as white flocks. The empty reactor was immediately recharged for the subsequent run. The polymers were recovered, washed and analyzed as described in Example II. Styrene content was determined spectrophotometrically by measuring absorbances of dilute polymer solutions in chloroform at 261.5 and 269 mm. The accuracy of the determination was about ±15 percent. Results are shown in Table II.

TABLE II

|  | Run No. | | |
| --- | --- | --- | --- |
|  | 1 | 2 | 3 |
| Ethylene/propylene (mole/mole) | 1/4 | 1/3.5 | 1/2.35 |
| Styrene (mls.) | 18 | 7 | 11 |
| VOCl$_3$ (millimole) | 2.7 | 2.0 | 2.5 |
| EtAlCl$_2$ (millimole) | 27.0 | 20.0 | 25.0 |
| Reaction Time (minutes) | 60 | 30 | 30 |
| Polymer yield (gms.) | 32.3 | 21.8 | 17.9 |
| Styrene content (percent by wt.) | (¹) | 1.3 | 3.8 |
| Propylene content (percent by wt.) | about 45 | 40.3 | 39.8 |
| Intrinsic viscosity (dl./g.) | 1.60 | 1.33 | 0.90 |
| X-ray crystallinity (percent) | 0 | 0 | <1 |

¹ Detected, not measured.

All polymers were rubbery and essentially free of crystallinity. The reactor inspected after the above three consecutive runs was found to be clean and free of any polymer deposits either on glass or metal parts. Runs made in the absence of styrene produced polymer solutions in which swollen gel was dispersed. Agitator and baffles were fouled to a degree that the reactor had to be cleaned after each run.

EXAMPLE IV

Ethylene, propylene and dicyclopentadiene were copolymerized using the procedure and the recipe of Example II except that allyl benzene was replaced by styrene. The results are shown in Table III.

TABLE III

| | Bottle No. | | | | | |
|---|---|---|---|---|---|---|
| | 1 | 2 | 3 | 4 | 5 | Control |
| Styrene (mls.) | 0.2 | 0.4 | 0.8 | 1.5 | 3.0 | Nil |
| Conversion (percent) | 21 | 20 | 20 | 22 | 23 | 28 |
| Intrinsic viscosity (dl./g.) | 0.85 | 0.67 | 0.73 | (1) | 0.5 | 0.73 |
| DCP content (percent by wt.) | 2.8 | 2.1 | 0.7 | (1) | 0.6 | 2.1 |
| Styrene content [2] (percent by wt.) | Nil | Trace | 4 | 7 | 10 | Nil |

[1] Not tested.
[2] Styrene content estimated from the U.V. spectrum.

The product of bottle No. 5 was fractionated in six fractions having different solubility in the mixture of heptane and ethanol. All fractions showed similar U.V. spectra in the area of the polystyrene peaks indicating that styrene units were uniformly distributed irrespective of the molecular weight of the polymeric molecules. All polymers were rubbery, amorphous and completely soluble in toluene and cyclohexane at room temperature.

EXAMPLE V

The effect of styrene on the copolymerization of ethylene, propylene and varying amount of dicyclopentadiene was investigated in 200 mls. pressure bottles using the procedure and the recipe of Example II except for the investigated variables. These variables and the results of the polymerization experiments are shown in Table IV.

TABLE IV

| | Bottle No. | | | | |
|---|---|---|---|---|---|
| | Control | 1 | 2 | 3 | 4 |
| Styrene (mls.) | Nil | 0.2 | 0.6 | 0.2 | 0.6 |
| DCP (mls.) | 0.9 | 0.9 | 0.9 | 0.6 | 0.6 |
| Conversion (percent) | 20 | 19 | 17 | 20 | 17 |
| DCP content (percent by wt.) | 18.1 | 17.6 | 16.1 | 12.9 | 11.5 |

The above polymers were rubbery, completely amorphous, 100 percent soluble in toluene and cyclohexane. Styrene was detected in polymers 1–4. The data indicate that styrene depresses the conversion of dicyclopentadiene.

EXAMPLE VI

Ethylene, propylene, dicyclopentadiene and styrene were copolymerized in a stirred 2-liter glass reactor to produce a quadripolymer; that is, a polymer containing units of four monomers. The polymerization procedure was as in Example III. The recipe was as in run No. 1 of Example III except that the amount of styrene was different and dicyclopentadiene was also added in amounts as indicated in Table V. The results are shown in Table V.

TABLE V

| | Run No. | | |
|---|---|---|---|
| | 1 | 2 | Control |
| Styrene charge (mls.) | 4.8 | 4.8 | Nil |
| DCP charge (mls.) | 1.8 | 3.6 | 1.8 |
| Polymer yield (gms.) | 72.5 | 43.8 | 80.7 |
| Intrinsic viscosity (dl./g.) | 1.33 | 1.28 | 1.67 |
| DCP content (percent by wt.) | 1.43 | 5.3 | (1) |
| Propylene content (percent by wt.) | 45 | 47.5 | 45.0 |
| Styrene content (percent by wt.) | 3 | 2.75 | Nil |

[1] Not tested.

Both polymers were free of crystallinity, completely soluble in toluene and formed clear transparent solutions in heptane. The control run produced a polymer solution in which a large amount of swollen gel was dispersed. The agitator and baffles were fouled and had to be cleaned. The control polymer recovered in a manner described in Example I showed 4 percent crystallinity by X-ray method.

EXAMPLE VII

Four copolymers, two saturated and two unsaturated, of the preceding examples were compounded with 50 parts per 100 parts of the copolymer of High Abrasion Furnace carbon black and curing agents, cured and tested for physical properties. The compounding recipe, curing conditions and physical test data are shown in Table VI.

TABLE VI

| | Compound Number | | | |
|---|---|---|---|---|
| | 1 | 2 | 3 | 4 |
| Polymer sample | Ex. III, Run 1 | Ex. I | Ex. VI, Run 1 | Ex. VI, Run 2 |
| Mooney viscosity (ML–4–100° C.) | [1] 16 | (High, not measured) | 32 | [1] 16.5 |
| Curing Agents (phr.): | | | | |
| Zinc oxide | Nil | Nil | 5 | 5 |
| Stearic acid | Nil | Nil | 1 | 1 |
| 2-mercapto benzo thiazole | Nil | Nil | 0.5 | 0.5 |
| Tetra methyl thiuram disulfide | Nil | Nil | 1.5 | 1.5 |
| Sulfur | 0.3 | 0.3 | 1.5 | 1.5 |
| Dicumyl peroxide | 2.6 | 2.6 | Nil | Nil |
| Cured at 153° C., tensile strength (kg./cm.$^2$): | | | | |
| 20 minutes curing | 90 | 320 | 150 | 222 |
| 80 minutes curing | 128 | 320 | 221 | 197 |
| Elongation, percent: | | | | |
| 20 minutes | 800 | 480 | 675 | 575 |
| 80 minutes | 675 | 450 | 595 | 320 |
| 300% Modulus (kg./cm.$^2$): | | | | |
| 20 minutes | 23 | 144 | 30 | 88 |
| 80 minutes | 38 | 149 | 81 | 187 |
| Tear strength (kg./cm.): | | | | |
| 20 minutes | 14.1 | (2) | 17.5 | 18.9 |
| 80 minutes | 18.4 | (2) | 28.0 | (2) |

[1] Estimated from the micro Mooney value.
[2] Not tested.

The above polymers all readily accepted carbon black and showed good millability at room temperature. Even compound No. 2 satisfactorily processed on the mill in spite of the high intrinsic viscosity of the polymer and on a curing with dicumyl peroxide produced a rubber of excellent physical properties. Compounds 3 and 4 were sulfur vulcanized and the rate of vulcanization depended on the degree of unsaturation. Compound No. 4 having a high DCP content (5.3%) was cured in 20 minutes to a similar modulus value as compound No. 3 in 80 minutes.

EXAMPLE VIII

Ethylene, propylene and butadiene were copolymerized in the presence of styrene in 1 liter crown capped standard bottles. The bottles were prepared and charged according to the procedure of Example II using the following recipe.

n-Heptane—650 milliliters
Styrene—Variable
Butadiene—Variable
¼ mixture of ethylene and propylene—40 grams
$VOCl_3$—1.5 millimoles
$EtAlCl_2$—13.5 millimoles Results are presented in Table VII.

TABLE VII

|  | Bottle No. | |
| --- | --- | --- |
|  | 1 | 2 |
| Styrene (milliliters) | 2 | 6 |
| Butadiene (milliliters) | 2 | 6 |
| Polymer yield (gms. in 1 hour) | 2.4 | 2.0 |
| Appearance of polymer cement | Clear | Clear |
| Butadiene content (wt. percent) | 3 | 5.8 |
| Styrene content (wt. percent) | About 2 | About 5 |

The products were hydrocarbon soluble.

EXAMPLE IX

Ethylene, propylene and cyclooctadiene-1,5 were copolymerized in the presence of styrene according to the procedure of Example II in 1 liter crown capped standard bottle. The following recipe was used:

n-Heptane—650 milliliters
Styrene—2 milliliters
Cyclooctadiene-1,5 (COD)—30 milliliters
¼ mixture of ethylene and propylene—54 grams
Tri(n-butyl)vanadate—1.5 millimoles
Ethyl $AlCl_2$—13.5 millimoles A control bottle was also charged in which styrene and cyclooctadiene were omitted. The polymers were compounded with 50 parts of HAF carbon black, 2.6 parts of dicumyl peroxide and 0.3 part of sulfur, all parts based on 100 parts of the polymer, and cured at 153° C. for 20 to 40 minutes. The results are shown in Table VIII.

TABLE VIII

|  | Copolymer, E/P/COD/Sty | Control |
| --- | --- | --- |
| Yield (grams) | 12 | 16.6 |
| COD content (wt. percent) | 0.7 | Nil |
| Styrene content (wt. percent) | Trace | Nil |
| Propylene content (wt. percent) | 40.9 | 52.2 |
| Raw Polymer Mooney [1] (ML-4-100° C.) | 12 | 12 |
| Compound Mooney [1] (ML-4-100° C.) | 40 | 48 |
| Milling behaviour | Good | Baggy |
| Compound behaviour | [2] | [3] |

[1] Estimated from micro Mooney viscosity.
[2] Fair to good.
[3] Poor acceptance of black, baggy.

The results indicate that the E/P/COD/Sty copolymer was easily milled and sheeted, readily accepted carbon black and showed a lower compound Mooney than control. In that respect, it was markedly better than the control polymer. When vulcanized at 153° C., both polymers showed essentially similar stress strain properties.

EXAMPLE X

Ethylene, propylene and styrene were polymerized in the presence of two catalyst systems. In one sytsem, vanadyl trichloride ($VOCl_3$) was admixed with a mixture of ethyl aluminum dichloride and diethyl aluminum monochloride in a molar proportion of 1 to 9 which corresponds to a compound of the following formula: $Et_{1.9}AlCl_{1.1}$. The other catalyst system contained sec-butyl vanadate $VO(Os-Bu)_3$ and $EtAlCl_2$. The experimental procedure of copolymerizing was as described in Example II. The recipe and charging sequence was as follows:

n-Heptane—130 mls.
Styrene—variable
⅑ mixture of ethylene and propylene—10.0±0.4 gms.
Vanadium compound—0.3 millimole
Aluminum compound—2.7 millimoles
Polymerization time—1 hour at room temperature The results are shown in Table IX.

TABLE IX

|  | Bottle Number | | | | | |
| --- | --- | --- | --- | --- | --- | --- |
|  | 1 | 2 | Control A | Control B | 3 | 4 |
| Vanadium compound | $VOCl_3$ | $VOCl_3$ | $VOCl_3$ | $VO(OBu)_3$ | $VO(OBu)_3$ | $VO(OBu)_3$ |
| Aluminum compound | $Et_{1.9}AlCl_{1.1}$ | $Et_{1.9}AlCl_{1.1}$ | $EtAlCl_2$ | $EtAlCl_2$ | $EtAlCl_2$ | $EtAlCl_2$ |
| Styrene (mls.) | 0.4 | 1.5 | 0.4 | Nil | 0.4 | 1.0 |
| Polymer yield (gms.) | 2.0 | 1.6 | 2.0 | 3.2 | 2.3 | 1.6 |
| Styrene content (wt. percent) | Trace | 7 | Trace | Nil | Trace | <5 |
| Solubility in n-heptane | 100 | 98 | 63 | 100 | 100 | 100 |

I claim:
1. A process of copolymerizing ethylene and propylene to produce an amorphous sulfur-vulcanizable gel-free rubbery copolymer which comprises contacting a mixture of 10–40 mole percent of ethylene, 90–60 mole percent of propylene and about 1–10 mole percent of a copolymerizable diene containing 4–12 carbon atoms in a non-reactive organic liquid medium with a catalyst comprising an alkyl aluminum chloride selected from sesquichlorides, dichlorides and mixtures thereof, and a hydrocarbon soluble compound of vanadium, in the presence of about 2–30 percent by weight, based on the total weight of ethylene, propylene and said diene, of vinylidene aromatic hydrocarbon.

2. The process as claimed in claim 1 wherein the vanadium compound is selected from vanadyl trichloride and vanadyl trialkoxides, said alkoxide each having 2–8 carbon atoms.

3. The process as claimed in claim 1 wherein said vinylidene aromatic hydrocarbon is styrene or allyl benzene.

4. An amorphous process of copolymerizing ethylene and propylene to produce a sulfur vulcanizable gel-free rubbery copolymer which comprises contacting a mixture of 10–40 mole percent of ethylene, 90–60 mole percent of propylene and about 1–10 mole percent of dicyclopentadiene in a non-reactive organic liquid medium with a catalyst containing ethyl aluminum dichloride and vanadyl trichloride in a molar ratio of about 3:1 to 20:1, in the presence of about 2–30 percent by weight, based on the total weight of ethylene, propylene and dicyclopentadiene, of styrene.

5. An amorphous sulfur vulcanizable, gel-free rubbery copolymer of ethylene, propylene, a diene containing 4–12 carbon atoms and a vinylidene aromatic hydrocarbon, said copolymer containing 25–75 mole percent of the units derived from ethylene, 1–10 mole percent of the units derived from the vinylidene aromatic hydrocarbon, and 0.5 to 20 mole percent of the units derived from said diene, the remainder of the units being derived from propylene.

6. A process of copolymerizing ethylene, at least one other aliphatic alpha olefin and a copolymerizable multiolefin to produce an amorphous sulfur-vulcanizable rubbery copolymer, which comprises contacting a mixture of ethylene, at least one other aliphatic alpha olefin containing 3–12 carbon atoms and a copolymerizable multiolefin with a catalyst comprising an organo-aluminum compound having the general formula $R_{(3-a)}AlX_a$ where R is a $C_1$–$C_{18}$ hydrocarbyl radical, X is halogen and $a$ is a number greater than 1 and smaller than 3 and a compound of vanadium, in the presence of less than 50 percent by weight based on the total weight of ethylene and said alpha olefin, of a vinylidene aromatic hydrocarbon.

7. The process as claimed in claim 6 wherein the aliphatic alpha olefin is propylene.

8. The process as claimed in claim 6 wherein the mixture is contacted with the catalyst in the presence of a non-reactive organic liquid.

9. The process as claimed in claim 7 wherein propylene is present in a concentration between 60 and 90 mole percent of the total monomers.

10. The process as claimed in claim 9 wherein the organo-aluminum compound is selected from the group consisting of alkyl aluminum sesquichlorides, alkyl aluminum dichlorides and mixtures thereof, said alkyl containing 2–8 carbon atoms.

11. The process as claimed in claim 10 wherein the vinylidene aromatic hydrocarbon is styrene or allyl benzene.

12. The process as claimed in claim 11 wherein the multiolefin is an aliphatic or cycloaliphatic diene having from 4–12 carbon atoms.

References Cited

UNITED STATES PATENTS

| | | | |
|---|---|---|---|
| 2,910,458 | 10/1959 | Goering | 260—80.6 |
| 3,390,141 | 6/1968 | Richards | 260—88.2 |
| 3,174,958 | 3/1965 | Solvik | 260—88.2 |
| 3,194,799 | 7/1965 | Coover | 260—93.5 |
| 3,091,601 | 5/1963 | Reding | 260—80.6 |

JOSEPH L. SCHOFER, Primary Examiner

R. S. BENJAMIN, Assistant Examiner

U.S. Cl. X.R.

260—80.78